United States Patent [19]

Simuro et al.

[11] 4,194,295
[45] Mar. 25, 1980

[54] LEVEL AND ANGLE ATTACHMENT FOR A CARPENTER'S FOLDING RULER

[76] Inventors: Ernest G. Simuro, 624 Fenimore Rd., Mamaroneck, N.Y. 10543; Abraham A. Turk; Nathan M. Turk, both of Rocking Horse Ranch, Highland, N.Y. 12528

[21] Appl. No.: 934,415

[22] Filed: Aug. 17, 1978

[51] Int. Cl.² ............................................. G01B 3/06
[52] U.S. Cl. ....................................... 33/458; 33/451
[58] Field of Search .................... 33/105, 88, 89, 342, 33/370, 371, 372, 373, 451, 458, 459, DIG. 1

[56] References Cited

U.S. PATENT DOCUMENTS

| | | |
|---|---|---|
| 160,503 | 3/1875 | Ascough . |
| 380,714 | 4/1888 | Evans . |
| 389,647 | 9/1888 | Hall et al. . |
| 659,147 | 10/1900 | Holsclaw . |
| 675,464 | 6/1901 | Carlson ..................................... 33/89 |
| 704,369 | 7/1902 | Pritt . |
| 734,014 | 7/1903 | Traut ...................................... 33/105 |
| 889,570 | 6/1908 | Ayers . |
| 913,703 | 3/1909 | Darter . |
| 999,899 | 8/1911 | Stanley ................................... 33/105 |
| 1,010,678 | 12/1911 | Gehrle . |
| 1,033,742 | 7/1912 | Skates . |
| 1,061,045 | 5/1913 | Campbell . |
| 1,969,052 | 8/1934 | West ...................................... 33/372 |
| 1,982,178 | 11/1934 | Rudolff .................................. 33/89 |
| 2,535,791 | 12/1950 | Fluke ............................... 33/DIG. 1 |
| 2,542,561 | 2/1951 | Olejniczak ............................ 33/342 |
| 2,720,705 | 10/1955 | Vincent .................................. 33/88 |
| 2,878,569 | 3/1959 | Metrulis ................................. 33/88 |
| 2,945,301 | 7/1960 | Peterson ............................... 33/1 R |
| 3,242,578 | 3/1966 | Moll ...................................... 33/342 |
| 3,335,498 | 8/1967 | Barbee ................................... 33/95 |
| 3,783,518 | 1/1974 | Jones .................................... 33/75 R |
| 3,824,700 | 7/1974 | Rutty .................................... 33/379 |

Primary Examiner—John W. Shepperd
Attorney, Agent, or Firm—Brumbaugh, Graves, Donohue & Raymond

[57] ABSTRACT

An attachment for a carpenter's folding ruler has an elongated body with a longitudinal slot. The slot is dimensioned to accept the ruler and the ends of the body have flat sections against which part of the ruler can be folded to form certain angles. One of the ends makes a 90° angle with the axis of the slot while the other end is at some angle less than 90°. A level is provided on the body so that it may be vertically or horizontally positioned.

10 Claims, 7 Drawing Figures

LEVEL AND ANGLE ATTACHMENT FOR A CARPENTER'S FOLDING RULER

BACKGROUND OF THE INVENTION

This invention relates to devices for leveling objects, setting objects at some angle with respect to level and cutting angular shapes in work pieces, and, more particularly, to combination level and angle devices.

Combination level, try-square and plumb devices which have a protractor or some other angle setting means, arranged to establish an angular relationship between two pivoting members of the device, and a level located in one of the members, are known from the prior art. For example, U.S. Pat. No. 3,945,301 to Peterson and U.S. Pat. No. 2,878,569 to Metrulis show such a device. Such devices, however, are separate tools and are not adapted to be inexpensive attachments to devices that the workmen already has, e.g., a folding ruler.

An attachment for a folding ruler is shown in U.S. Pat. No. 2,720,705 to Vincent. This arrangement has a plumb bob so that when the folding ruler is extended it may be leveled. Also, the attachment may be set at predetermined angles with respect to the ruler so that when the plumb bob indicates level, the ruler will be at a fixed slope with respect to the horizontal. The ruler itself, however, is not folded to form some angle and therefore, it cannot be used to draw a simple complete angle on a work piece with one adjustment. Rather one side of the angle is drawn and then the attachment must be readjusted to draw the other side.

U.S. Pat. No. 389,647 to Hall et al. and U.S. Pat. No. 1,061,045 to Campbell show devices with particular angularly arranged members and a level so that slopes can be drawn. These devices are attached to a folding ruler, but the ruler only acts as a holder and is not folded to form an angle.

It would be advantageous if a simple inexpensive device were available which could be attached to a folding ruler so that it can be leveled and folded at particular angles.

SUMMARY OF THE INVENTION

The present invention is directed to reducing the problems of leveling a work piece, setting it at an angle and making an angular cut in it by providing an attachment to a folding ruler, which attachment has a level and angular ends against which the ruler may be folded to establish desired angular relationships.

In an illustrative embodiment of the invention the attachment is formed as an elongated body or member with a longitudinal slot adapted to receive the ruler. A level is positioned on the member so that it and the section of ruler it holds can be leveled. One end of the body makes a 90° angle with the axis of the slot and the other makes some smaller angle with respect to the axis of the slot. The folding ruler can be positioned in the slot so that one of its joints is adjacent an end of the body. By folding part of the ruler against the end, that part will be at an angle with respect to the part of the ruler in the slot. Therefore, the two parts of the ruler can be used to position a work piece or to cut an angular shape in it. This shape can be related to the horizontal or vertical direction because of the level.

In preferred embodiments the slot is open and is provided with a spring device so that the attachment can be snapped onto a center portion of the ruler between its joints.

BRIEF DESCRIPTION OF THE DRAWINGS

The foregoing and other features of the present invention will be more readily apparent from the following detailed description and drawing of illustrative embodiments of the invention in which.

DESCRIPTION OF EXEMPLARY EMBODIMENTS

Figure 1:
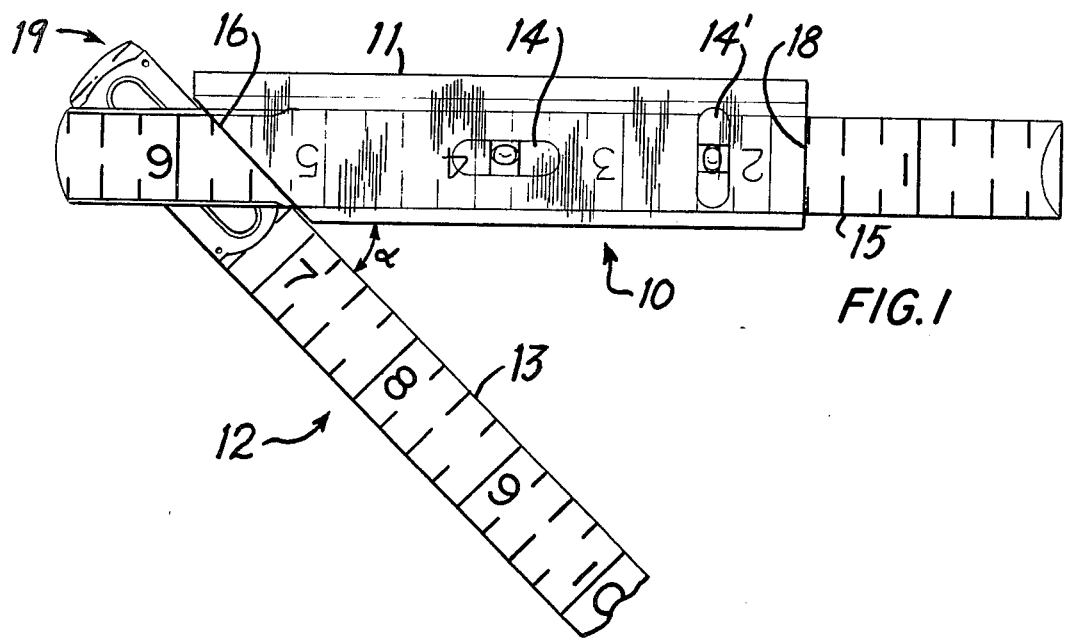
FIG. 1 is a view of an attachment according to the present invention mounted on a folding carpenter's ruler.

In FIG. 1 there is shown an attachment 10 for a carpenter's ruler 12. The body 11 of the attachment is preferably elongated and made of a clear plastic material so that the ruler can be read through it. However, it can also be made in other shapes and of other materials. Also the use of a plastic reduces material and manufacturing costs, while still providing a rugged unit. A longitudinal slot 20 (FIG. 2B) is provided in the body for receiving the end section 15 of the folding ruler. The rest of the ruler after a first joint 19 is folded so that section 13 of the ruler is aligned within an end 16 of the body that is at an angle of less than 90° with respect to the axis of the slot 20. As a result sections 13 and 15 of the ruler form the angle α. Preferably, this angle is either 45° or 60° since these angles have the most common use in construction. With the angle established between the sections of the ruler, it can be placed on a work piece so that the angle can be scribed in it; then a carpenter can cut the angle in the work piece.

The other end 18 of the body is at a 90° angle with respect to the axis of the slot. Therefore, the end section 15 of the ruler can be inserted into the body from that end so that sections 13 and 15 would form a 90° angle. In order to make sure that the angles formed by folding the ruler against the ends of the body are accurate, the ends are made flat, at least where the ruler sections contact the ends.

A horizontal level vial or bubble 14 and a vertical level 14' are also provided on the member or body 11. As a result the ruler 12 can be used to level widely separated work pieces with respect to each other, provided, of course, that the unfolded ruler is relatively straight. The levels also allow a work piece to be positioned in a vertical, horizontal or angular direction and permit an angle to be established on a work piece with respect to these directions.

Figure 2A:
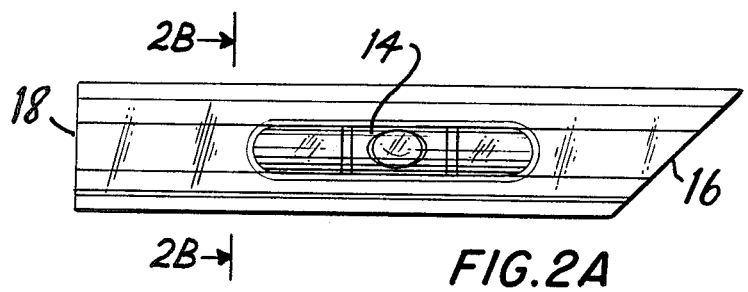
FIGS. 2A and 2B are front and end sectional views of an attachment according to the present invention.
Figure 2B:
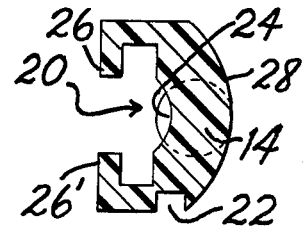

The attachment illustrated in FIG. 2A has a 45° angle at end 16 and the 90° angle at end 18. It is provided with one large horizontal level 14. As can be seen from FIG. 2B a recess 24 is established to one side of slot 20 to assist in inserting the level. Also one side wall of the slot is partially removed creating an aperture defined by the opposite ridges 26 and 26'. The size of the apertures and the recess 24 are such that during manufacture of the attachment, the level can be passed axial along slot 20 until it reaches a cut out in body 11 designed to hold it. A recess 22 is formed in the bottom of body 11 so that it may be moved along sharp-edged work pieces with ease or mounted on top of a center section of the ruler. The side 28 of the body opposite the aperture may be curved to magnify the markings on the ruler when read through the plastic body.

Figure 3A:
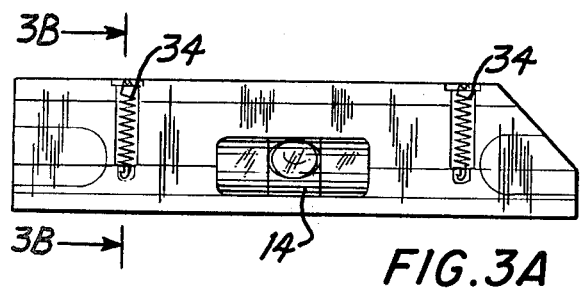
FIGS. 3A and 3B are front and end sectional views of an alternative embodiment of an attachment according to the present invention in which the attachment is in two parts connected by springs.
Figure 3B:
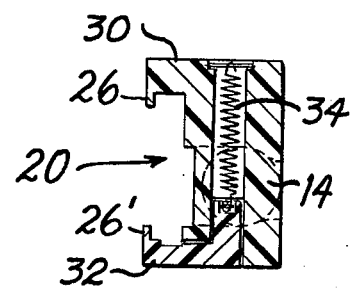

The slot 20 is dimensioned so that the section 15 of the ruler fits snugly within it. However, since the ruler has a double thickness at joint 19, it is not possible to position the attachment of FIG. 2 on one of the middle sections of the folding ruler. In order to ocercome this disadvantage a two part attachment as shown in FIGS. 3A and 3B can be used. The main part 30 of the body 11 holds the level 14 and creates the top and side walls of slot 20. The secondary part 32 of the body 11 has a C or L shape with one leg received within a groove in the main body. The part 32 forms the bottom edge of the slot 20. In order to hold these pieces (30 and 32) together, springs 34 are provided in holds leading from the recess in the main body to the upper surface of the main body. These springs 34 are attached to both parts of the body. Since the parts of the body are held together by spring force, the attachment can be added to a middle section of a folding ruler by pulling them apart a sufficient distance to allow the edges of the ruler to clear the opposite ridges 26, 26' of the body. Then when the parts are released the ruler section becomes trapped in slot 20 by the ridges 26, 26'.

Figure 4A:
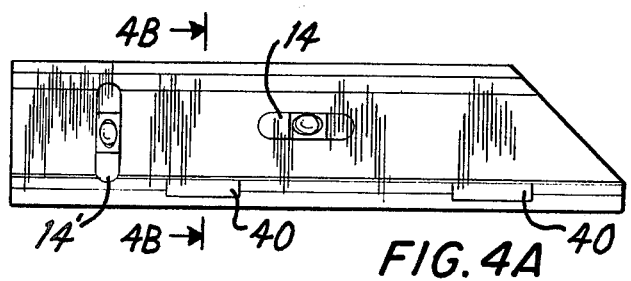
FIGS. 4A and 4B are front and end elevational views of an additional alternative embodiment of an attachment according to the present invention in which a band spring is included for connecting the device to a ruler.
Figure 4B:
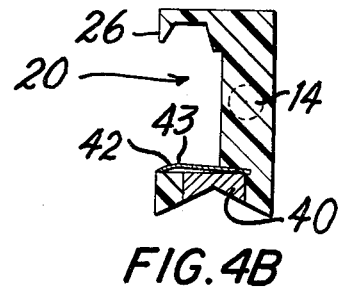

As an alternative to the attachment shown in FIG. 3, a one-piece device that can be connected to a center section of the ruler as shown in FIGS. 4A and 4B. In the device of FIG. 4 the bottom wall of the slot 20 is provided with a band 42 of spring steel or similar material. This band has a bend 43 in it which partially closes the open side of slot 20, thus serving the same function as ridge 26'. If a center section of the ruler has one edge inserted into the slot 20 under the ridge 26, the other edge can be pushed against band 42. This will cause band 42 to flatten, thus allowing the ruller to enter the slot. Once the ruler has proceeded into the slot past the bend in band 42, the band will spring up behind the ruler and hold it in the slot.

The bottom of the attachment in FIG. 4 has a V-shape so that it may conveniently be placed on pipes or other cylindrical objects. This shape may also be used to fit the device on the edge of rectangular work pieces or work pieces with other shapes. The bottom has magnets 40 spaced along it so that the device can be held on metallic work pieces. The magnets can be replaced with a magnetic tape running along the bottom of the body.

While the present invention has been particularly shown and described with reference to preferred embodiments thereof, it will be understood by those skilled in the art that various changes in form and details may be made therein without departing from the spirit and scope of the invention.

We claim:

1. An attachment for a folding carpenter's ruler comprising:

an elongated member formed of first and second elongated bodies having a slot running along its longitudinal extension, said member having a generally rectangular cross-sectional shape with part of one side open to the slot so as to form two opposed longitudinal ridges, one each of the two opposed ridges being located on a separate one of the first and second bodies, said slot being dimensioned such that the ruler, at least between its folding joints, can be received in it, the ends of said member where the ruler extends being flat, one of said ends being at a 90° angle with the axis of said slot and the other being at some other angle less than 90°, said ends being designed such that a folding ruler inserted in said slot can be folded against one of the ends of the member so as to form an angle related to the angle between that end and the axis of the slot;

spring means for allowing the distance between the longitudinal ridges to be increased to such an extent that the ruler can be seated in the slot via the open side of the member, said spring means being at least one spring for holding the first and second bodies together so that the open side of the slot can be increased by exerting a force to expand said spring; and at least one level located on said member at a predetermined angle with respect to the axis of said slot, whereby the ruler can be aligned with respect to a direction determined by the at least one level.

2. An attachment for a folding carpenter's ruler comprising:

an elongated member having a slot running along its longitudinal extension, said member having a generally rectangular cross-sectional shape with part of one side open to the slot so as to form at least one longitudinal ridge along the slot opening which faces another side wall of the slot, said slot being dimensioned such that the ruler, at least between its folding joints, can be received in it, the ends of said member where the ruler extends being flat, one of said ends being at a 90° angle with the axis of said slot and the other being at some other angle less than 90°, said ends being designed such that a folding ruler inserted in said slot can be folded against one of the ends of the member so as to form an angle related to the angle between that end and the axis of the slot;

spring means for allowing the slot opening to be increased to such an extent that the ruler can be seated in the slot via the open side of the member, said spring means being formed by a longitudinally bent band of spring material located in the slot along said another side wall of the slot so as to form a ridge opposing the at least one longitudinal ridge of the elongated member such that the open side of the slot can be increased by exerting a force to flatten the bend in said spring material; and at least one level located on said member at a predetermined angle with respect to the axis of said slot, whereby the ruler can be aligned with respect to a direction determined by the at least one level.

3. An attachment as claimed in claim 1 or 2 wherein said at least one level includes a level perpendicular to the axis of the slot and a level parallel to the axis of the slot.

4. An attachment as claimed in claim 1 or 2 wherein said elongated member is made of a clear plastic material.

5. An attachment as claimed in claim 1 or 2 wherein the other angle of the other end is 45°.

6. An attachment as claimed in claim 1 or 2 wherein the other angle of the other end is 60°.

7. An attachment as claimed in claim 1 or 2 wherein the wall of the slot opposite the side with the longitudinal ridges contains a recess, the space between the ridges and the recess being dimensioned so that the level can be inserted into the slot and positioned on the body.

8. An attachment as claimed in claim 1 or 2 wherein the member has its bottom formed with a groove.

9. An attachment as claimed in claim 1 or 2 wherein the member has its bottom formed with a V shape.

10. An attachment as claimed in claim 1 or 2 wherein the member has its bottom provided with magnetic material for fixing the attachment on metallic work pieces.

* * * * *